US010038598B2

(12) United States Patent
Vetrovsky et al.

(10) Patent No.: US 10,038,598 B2
(45) Date of Patent: Jul. 31, 2018

(54) LEVERAGING AND EXTENDING MOBILE OPERATING SYSTEM MDM PROTOCOL (71) Applicant: MOBILE IRON, INC., Mountain View, CA (US)

(72) Inventors: Tomas Vetrovsky, Mercer Island, WA (US); Pavel Zeman, Kirkland, WA (US); Thanhy Mather, Bellevue, WA (US)

(73) Assignee: MOBILE IRON, INC., Mountain View, CA (US)

( * ) Notice: Subject to any disclaimer, the term of this patent is extended or adjusted under 35 U.S.C. 154(b) by 0 days.

(21) Appl. No.: 15/604,091

(22) Filed: May 24, 2017

(65) Prior Publication Data

US 2017/0366402 A1  Dec. 21, 2017

Related U.S. Application Data (60) Provisional application No. 62/351,430, filed on Jun. 17, 2016.

(51) Int. Cl.
*H04M 3/00* (2006.01)
*H04L 12/24* (2006.01)
*H04W 4/50* (2018.01)
*H04L 29/08* (2006.01)
*H04W 8/24* (2009.01)
*H04L 29/06* (2006.01)

(52) U.S. Cl.
CPC ......... *H04L 41/0893* (2013.01); *H04L 41/28* (2013.01); *H04W 4/50* (2018.02); *H04L 63/0272* (2013.01); *H04L 67/04* (2013.01); *H04L 67/1095* (2013.01); *H04W 8/245* (2013.01)

(58) Field of Classification Search
CPC . H04L 41/0893; H04L 63/0272; H04L 67/04; H04L 67/1095; H04W 4/001; H04W 8/245
USPC .......................................................... 455/418
See application file for complete search history.

(56) References Cited

U.S. PATENT DOCUMENTS

| 6,721,868 | B1 | 4/2004 | Natu |
| 7,243,356 | B1 | 7/2007 | Saulpaugh |
| 7,694,328 | B2 | 4/2010 | Joshi |
| 8,650,559 | B2 * | 2/2014 | Benari ................... G06F 9/455 709/220 |

(Continued)

*Primary Examiner* — Huy C Ho
(74) *Attorney, Agent, or Firm* — Van Pelt, Yi & James LLP (57) ABSTRACT In various embodiments, a device may include a communications interface configured to receive, from the device management server, an indication to perform an action that requires access to a privileged user space. The device may include a processor configured to use a bridge service to perform the action, where the bridge service runs in a security context that enables the service to operate in the privileged user space. In various embodiments, a server may include a communications interface and a processor. The processor may be configured to receive an indication to perform a management action not within a native device management functionality. The processor may be further configured to invoke a bridge service running on the managed device to perform the action by sending a request via the communications interface, where the bridge service runs in a security context that enables the service to operate in the privileged user space.

22 Claims, 5 Drawing Sheets (56) References Cited

U.S. PATENT DOCUMENTS

| | | |
|---|---|---|
| 8,695,058 B2 | 4/2014 | Batchu |
| 8,811,970 B2 | 8/2014 | Danford |
| 9,031,562 B2 | 5/2015 | Brownworth |
| 9,042,862 B2 | 5/2015 | Rege |
| 9,129,279 B1 | 9/2015 | Zeanah |
| 2015/0319252 A1* | 11/2015 | Momchilov .......... H04L 67/141 709/223 |
| 2017/0006140 A1* | 1/2017 | Park ........................ H04L 45/66 |

* cited by examiner

LEVERAGING AND EXTENDING MOBILE OPERATING SYSTEM MDM PROTOCOL

CROSS REFERENCE TO OTHER APPLICATIONS

This application claims priority to U.S. Provisional Patent Application No. 62/351,430 entitled LEVERAGING AND EXTENDING MOBILE OPERATING SYSTEM MDM PROTOCOL filed Jun. 17, 2016 which is incorporated herein by reference for all purposes.

BACKGROUND OF THE INVENTION

An enterprise may manage company-owned devices, employees' devices, and/or other devices using mobile device management (MDM) functionality provided on mobile operating systems. For example, an MDM agent and/or protocol of the operating system may allow an enterprise administrator to perform management functions with respect to the device. The enterprise administrator may want to perform management functions beyond those provided by a native MDM of the operating system. However, currently, some mobile operating systems only support non-customizable native MDM agents and do not allow or support third party MDM agents. These mobile operating systems typically do not provide customized MDM functions.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Leveraging and extending a mobile operating system MDM protocol is disclosed. In various embodiments, a system includes a device and a device management (MDM) server. The device may include a communications interface configured to receive, from the device management server, an indication to perform an action that requires access to a privileged user space of the device. The device may include a processor configured to use a bridge service to perform the action, wherein the bridge service runs in a security context that enables the service to operate in the privileged user space. The server may include a communications interface and a processor coupled to the communications interface. The processor may be configured to receive, via an administrative user interface, an indication to perform with respect to a managed device, a management action not within a native device management functionality of the managed device. The processor may be further configured to invoke a bridge service running on the managed device to perform the action by sending a request via the communications interface, where the bridge service runs in a security context that enables the service to operate in the privileged user space.

The techniques disclosed herein may provide an alternative to the typical approaches that install (i) a third party MDM management application or (ii) a native MDM with pre-defined and non-customizable functions. Using the approaches disclosed herein, MDM service administrators are able to perform management functions beyond those provided by a native MDM agent without needing to install a third-party MDM management application. In addition a seamless user experience is provided for an administrator by automatically selecting between a native MDM agent and an MDM bridge service to perform a desired task in response to an administrator's request.

Figure 1:
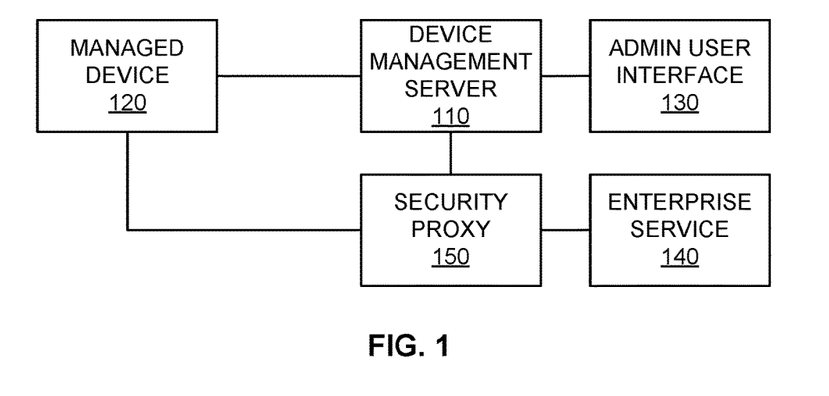
FIG. 1 is a block diagram illustrating an embodiment of a system to provide customized MDM management.

FIG. 1 is a block diagram illustrating an embodiment of a system to provide customized MDM management. The system includes a device management server 110, a managed device 120, an administrator user interface 130, an enterprise service 140, and a security proxy 150. In one aspect, the system of FIG. 1 provides customized MDM management of managed device 120 by device management server 110 by leveraging and extending a native MDM protocol.

The device management server 110 provides management functionality with respect to one or more devices such as managed device 120. In the example shown, the device management server provides to device 120 secure access to enterprise back end applications and services 140. The device management server may be configured to configure the device 120 to be managed by the device management server and associated elements, such as security proxy 150. The device management server may be configured to establish MDM control over device 120 via an MDM bridge service, such as by causing an MDM bridge service to be installed on the device control at least part of the functionality of the device. For example, the device management server may determine which command to send to a native MDM and which commands to send to the MDM bridge service. The native MDM and MDM bridge service carry out respect commands to control the functionality of the device. The device management server may be implemented by a mobile device management (MDM) server, an enterprise mobile management server (EMM), or the like.

The managed device 120 is a device that can be used to access enterprise service 140 via security proxy 150. By way of non-limiting example, the managed device may be implemented by a physical device such as a smart phone, tablet, laptop, and/or smart wearable. In various embodiments, the device includes an MDM agent and/or an MDM bridge service. The MDM agent may include one or both of a native MDM client and/or functionality of a mobile operating system (e.g., iOS®, Android®) of the device 120. The MDM bridge service may be configured to provide customized MDM functionalities and may be provided by a third party mobility management provider, such as Mobile Iron, Inc.® Examples of a managed device is further described herein with respect to FIGS. 2 and 3.

The administrator user interface 130 enables an administrator to control the device management server. For example, an administrator may specify desired management functionalities and receive access analytics via the user interface 130. Techniques described herein allow the administrator to use the user interface to perform customized management functionalities. For example, an action specified by the administrator via the user interface may be automatically carried out by a native MDM agent and/or an MDM bridge service. In various embodiments, the administrator can specify a range of actions to be performed by the native MDM agent and/or the MDM bridge service in a unified user interface. In response, the native MDM agent and/or the MDM bridge service is automatically selected to perform the action requested by the administrator. The administrator need not select between a native MDM and an MDM bridge service. Instead, an administrator specifies an action and the component to perform the action (native MDM or MDM bridge service) is automatically selected.

The enterprise service 140 includes enterprise back end content. The enterprise service 140 may include applications and services such as files, documents, email, calendar, contacts, and the like. The enterprise service may include cloud-based enterprise storage and applications. Access to the enterprise service may be managed by the device management server 110 and the security proxy 150. For example, some devices may have access to certain portions of the enterprise service but not other portions as defined by the device's permission levels.

The security proxy 150 is configured to perform security and authentication procedures to secure communications between the device 120 and the enterprise service 140. The security proxy can be implemented by a gateway that manages, encrypts, and secures traffic between the device and back-end enterprise services. For example, the device management server 110 may provide a trusted certificate (e.g., SSL) via the security proxy to authenticate the managed device 120 with the device management server. Components of the device 120 such as an MDM bridge service may communicate with the enterprise service via the security proxy using typical communication protocols.

In operation, a user of the managed device 120 obtains secure access to enterprise backend applications and services 140 as follows. A user of the device 120 may enroll a device by logging in at device 120 using a management agent (e.g., a native MDM agent configured by device management server 110, etc.). As part of the enrollment process, an MDM bridge service may be installed on the managed device. Device management server 110 uses configuration, device profile, user profile, and/or policy information in a device management database (not shown) to manage device 120 and provide secure access to enterprise back end applications and services 140. In various embodiments, the MDM bridge service is configured to modify components of the device in accordance with the management policies. The MDM bridge service may act alone or in conjunction with a native MDM agent. The device management server 110 may provide separate instructions to the MDM bridge service and the native MDM agent in response to requests made by each of the MDM bridge service and the native MDM agent.

Figure 2:
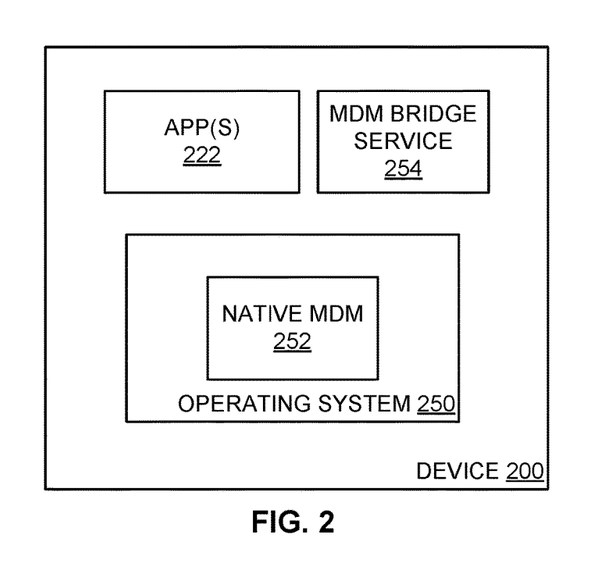
FIG. 2 is a block diagram illustrating an embodiment of a device configured to host an MDM bridge service.

FIG. 2 is a block diagram illustrating an embodiment of a device 200 configured to host an MDM bridge service. In various embodiments, app(s) 222 are brought under management by a management server such as management server 120 of FIG. 1. In various embodiments, the native MDM 252 is provided in an operating system 250 of the device. The operating system 250 includes system software that supports device hardware and provides common services for applications and programs such as applications 222. In the example shown, the operating system includes a native MDM 252.

In one aspect, the system of FIG. 2 provides customized MDM management of device 200 by device management server (e.g., management server 110 of FIG. 1) by leveraging and extending a native MDM protocol 252 to provide customized functions in addition to default functions of the native MDM protocol. For example, the native MDM protocol 252 is extended by installing an MDM bridge service 254.

The native MDM 252 may be configured to deploy, configure, maintain, and support software and hardware components on the device. The native MDM may be implemented by an agent that performs pre-defined management functionalities. In some embodiments, the functionalities of the native MDM functions are shipped with the device and not customizable. In various embodiments, the native MDM responds to requests by a management server (e.g., management server 110 of FIG. 1) for device information such as address/network location, installed applications, information about the device's hardware, blacklisting or whitelisting third party applications, etc. The native MDM may be configured to control the device's hardware and software such as defining a password policy, encryption, remote wipe, and controlling the device's hardware such as camera, microphone, and/or applications such a Web browser.

The MDM bridge service 254 may be configured to perform functions instructed by an associated management server such as management server 110 of FIG. 1. Unlike the native MDM, the MDM bridge service (also referred to as a "bridge service") can be more flexible and perform functions defined by a system administrator such as functions defined via administrator user interface 130 of FIG. 1. In one aspect, the MDM bridge service can perform various commands on components of device such as controlling or instructing applications, installing scripts, modifying a registry, modifying a file system, etc. as further described here. In another aspect, the MDM bridge service may be configured to execute any OS-level command, modify the OS or application behavior via registry modification, and/or manipulate any file. For example, the MDM bridge service may run as a system account, e.g., run in the background as system.

Figure 3:
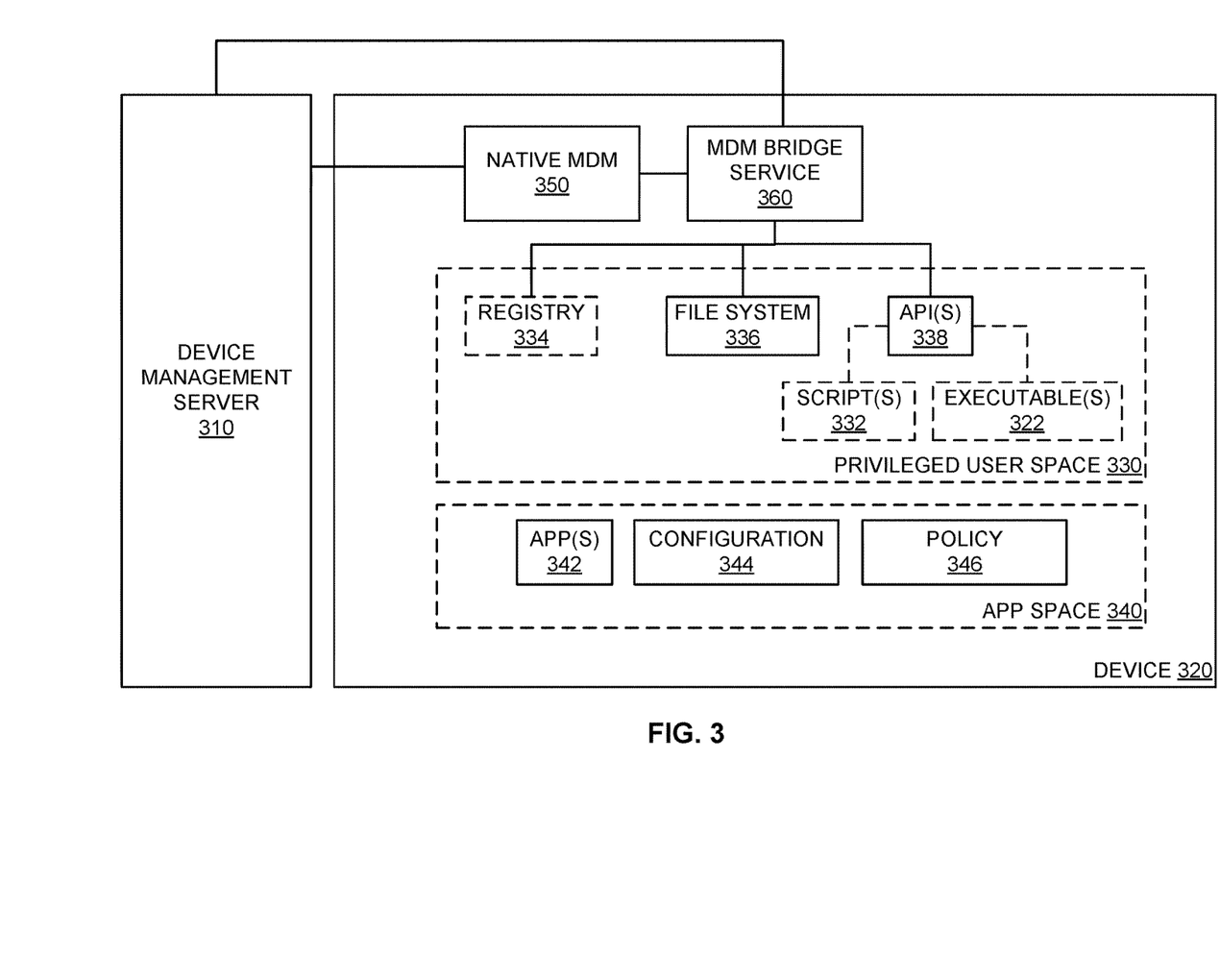
FIG. 3 is a block diagram illustrating an embodiment of a system configured to leverage and extend a mobile operating system MDM protocol.

FIG. 3 is a block diagram illustrating an embodiment of a system configured to leverage and extend a mobile operating system MDM protocol. The system includes a device management server 310 and a device 320. The device management server 310 provides management functionality with respect to one or more devices, such as device 320. An example of device management server 310 is device management server 110 of FIG. 1. The device 320 provides access to enterprise services and data. An example of device 320 is device 200 of FIG. 2.

In this example, device 320 includes a registry 334, a file system 336, and one or more APIs 338. The registry 334 stores configuration information for the device's system components such as software applications and hardware components associated with the device. In some platforms, the registry is not capable of being edited. The file system 336 organizes and defines how data is stored and retrieved on the device. The API(s) 338 provide an interface for applications, e.g., abstracting underlying implementation while providing actions and objects in response to external queries. The API(s) may bring external (e.g., third party or enterprise) scripts 332 or executables 322 for installation on the device. The script(s) 332 may be defined by an administrator to customize behavior of an end-point. For example, the scripts 332 may include PowerShell scripts that define task automation and configuration for local and remote Windows® systems. The executable(s) 322 may include third party executables and enterprise executables that can be brought to and/or run on the device. The script(s), registry, file system, API(s), and executable(s) may be provided in a privileged user space 330, which represents an area accessible by a particular user and not by other users.

In this example, device 320 includes one or more applications 342, one or more configuration specifications 344, and one or more policy specifications 346. An example of application(s) 342 is application 222 of FIG. 2. In some embodiments, the MDM bridge service is configured to install, uninstall, and/or modify applications 342 on device 320. An example of application installation is shown in FIGS. 6A-6D. The configuration specification(s) 344 define configuration space of device 320. The policy specification(s) 346 define operational rules and procedures for device 320. Although shown separately, the configuration specifications 344 and policy specifications 346 may be combined.

In this example, the device includes a native mobile device manager 350 and a mobile device management bridge service 360. An example of a native MDM is native MDM protocol 252 of FIG. 2. An example of the MDM bridge service 360 is MDM bridge service 254 of FIG. 2. The native MDM 350 and MDM bridge service 360 may each be communicatively coupled to device management server 310. In various embodiments, device management server 310 may instruct native MDM 350 and/or MDM bridge service 360 to execute a function. In various embodiments, native MDM 350 and MDM bridge service 360 may be communicatively coupled.

In various embodiments, MDM bridge service 360 provides granular control over permissions to access operating system components. In some embodiments, the MDM bridge service is configured to provide access to operating system components based on pre-defined permissions. For example, the device management server is configured to define what the MDM bridge service is permitted to provide to a particular user or administrator user. Suppose that the number of administrators able to see encryption keys is limited. To implement this security feature, the device management server instructs the MDM bridge service to provide a limited number of encryption keys to administrators. Upon meeting the pre-defined limit, the device management server instructs the MDM bridge service to stop providing additional encryption keys. As another example, the device management server instructs the MDM bridge service to provide encryption keys only to particular administrators.

In some embodiments, the MDM bridge service 360 is configured to install or execute script(s) 332. For example, the MDM bridge service installs, executes, or modifies PowerShell scripts to define task automation and configuration for local and remote Windows® systems. The MDM bridge service may facilitate installation of a script on the device. Among other things, a script may be configured to modify system files including other scripts. In some instances, this enables customization and performance of desired functions at a finer granularity compared with systems that do not have an MDM bridge service. In various embodiments, the script(s) may be obtained via an API 338 or OS utility.

In some embodiments, the MDM bridge service 360 is configured to manage registry 334. For example, the MDM bridge service is configured to add and/or remove registry keys. By adding or removing registry keys, the MDM bridge service accesses and/or modifies low-level settings for the operating system and for applications. Unlike systems that only have native MDM functionality with a pre-defined set of capabilities, the MDM bridge service enables an administrator to customize the operating system and/or applications as desired. In one aspect, this allows modification of aspects (e.g., objects) of the operating system that are not accessible by a native MDM agent.

In some embodiments, the MDM bridge service 360 is configured to manage file system 336. For example, the MDM bridge service reads from the file system, writes to the file system, and/or checks for the existence of a file in the file system. In one aspect, the MDM bridge service can modify various files in the file system. In another aspect, the MDM bridge service can provide access to various files in the file system. For example, the MDM bridge service can distribute a third party license file, download a third party log file, etc.

In some embodiments, the MDM bridge service 360 is call and/or execute API(s) 338 or utilities. For example, the MDM bridge service accesses a script, executable, or application using its corresponding API to instruct the script, executable, or application to perform desired actions. The MDM bridge service may be configured to bring external (e.g., third party or enterprise) executables and/or scripts to the device and install the executables or scripts on the device.

In some embodiments, the MDM bridge service 360 is configured to execute executable(s) 322. For example, the MDM bridge service, brings (e.g., loads) new executables into the device and runs the executables. In some instances, an executable may be called from a script such as script(s) 332. In some instances, the MDM bridge service can load and run an executable without using a script.

In operation, the MDM bridge service 360 may be deployed to an end-point (here, the device 320) by management server 310. An example process of installing the MDM bridge service is further described herein with respect to FIG. 4. In various embodiments, after installation, the MDM bridge service automatically starts and continues executing in the background. The MDM bridge service may be configured to communicate with management server 310 using a protocol such as HTTP GET/POST. The MDM bridge service may be authenticated by certificate authentication. For example, at the time the MDM bridge service is installed on the OS, system certificate configurations and local computer certificate key stores may be updated to subsequently authenticate the MDM bridge service.

In various embodiments, the MDM bridge service 360 is implemented by an API such as a Win32 component that runs in the background as a Windows® service. In various embodiments, the MDM bridge service is headless (does not have an UI), is transparent to the user, and runs in the background. This security feature may prevent a local administrator from modifying the bridge service because the service is running in the background. In some embodiments, the MDM bridge service is packaged into an installer such as an MSI installer.

Figure 4:
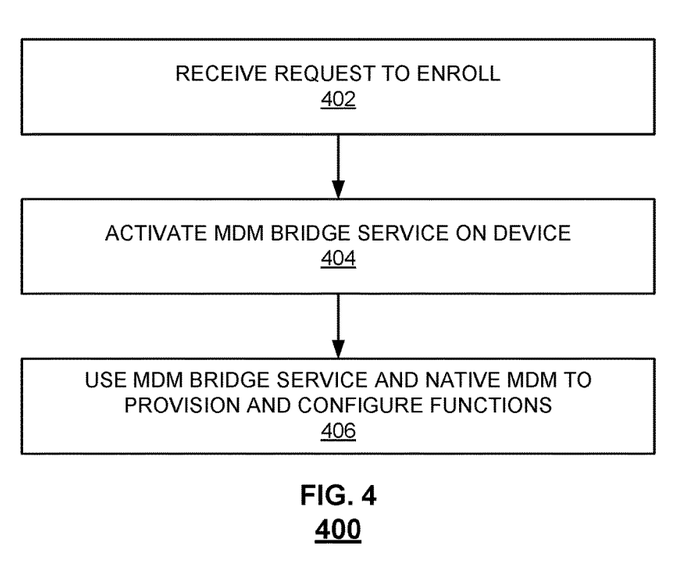
FIG. 4 is a flow chart illustrating an embodiment of a process to install an MDM bridge service.

FIG. 4 is a flow chart illustrating an embodiment of a process to install an MDM bridge service. In various embodiments, the process of FIG. 4 may be performed by a device management server such as device management server 310 with respect to a device such as device 320 of FIG. 3.

In the example shown, a request to enroll is received (402). In various embodiments, the request to enroll is made by a device to a device management server. The request to enroll begins a process of enrolling a device with the device management server to enable the device to access corporate resources (such as enterprise service 140 of FIG. 1). The enrollment may be carried out using the native MDM of the operating system.

In response to the request to enroll, an MDM bridge service is activated on the device (404). In various embodiments, the MDM bridge service is provisioned through a native MDM. For example, the native MDM may be shipped with a device. As part of an enrollment process, the MDM ridge service may be activated to perform the processes further described herein. In various embodiments, the MDM bridge service is installed on the device with a pre-determined level of privilege to access and/or modify components of the operating system of the device. In some embodiments, the MDM bridge service is automatically activated according to typical MDM enrollment procedures. In some embodiments, the MDM bridge service is provided as an MSI package for installation on the device. In some embodiments, the MDM bridge service is silently installed with one or more other apps such that a user is unaware that the MDM bridge service has been installed.

In various embodiments, the MDM bridge service is configured to communicate with other system components securely. The MDM bridge service may be installed by extending a native MDM protocol of the OS. For example, the MDM bridge service may be configured to have one or more functions of the native MDM protocol without having one or more limitations of the native MDM protocol. This may allow an administrator to execute any command that the OS is capable of via file manipulations, registry modifications, script executions, and the like. In some embodiments, the MDM bridge service is configured to modify system components. For example, the MDM bridge service may be configured with local environment variables and to handle various script file extensions including PowerShell, registry, executables, etc.

Upon enrollment, the MDM bridge service and/or the native MDM are used to provision and configure functions (406). In some embodiments, a user gives the MDM bridge service administrator privileges. The MDM bridge service can periodically check with the device management server to see if there are any outstanding functions to perform. If there are outstanding functions, the MDM bridge service proceeds to execute those functions. In various embodiments, the status or result of the execution of the function is reported asynchronously back to the device management server. This may conserve processing power because data transfer may be performed in batches. An example of 406 is process 500 of FIG. 5.

In some embodiments, the MDM bridge service and the management server communicate in response to a trigger. For example, communications are initiated when a connection using an MDM protocol is detected or a push notification instructing a device (hosting the MDM bridge service) to connect at a particular time. In some embodiments, the MDM bridge service and the management server communicate periodically. For example, communications occur every few hours.

In various embodiments, the MDM bridge service is configured to communicate with the device management server without having its own independent timer or listener. For example, the MDM bridge service observes messages passed between a native MDM protocol to an event viewer (such as a Windows 10® Event Log) and detects the start of the MDM communication. The MDM bridge service then synchronizes its communications with those of the native MDM protocol such that changes and/or commands made by the administrator can be executed at the same time, regardless of whether the changes and/or commands were initiated by the native MDM protocol or the MDM bridge service.

Figure 5:
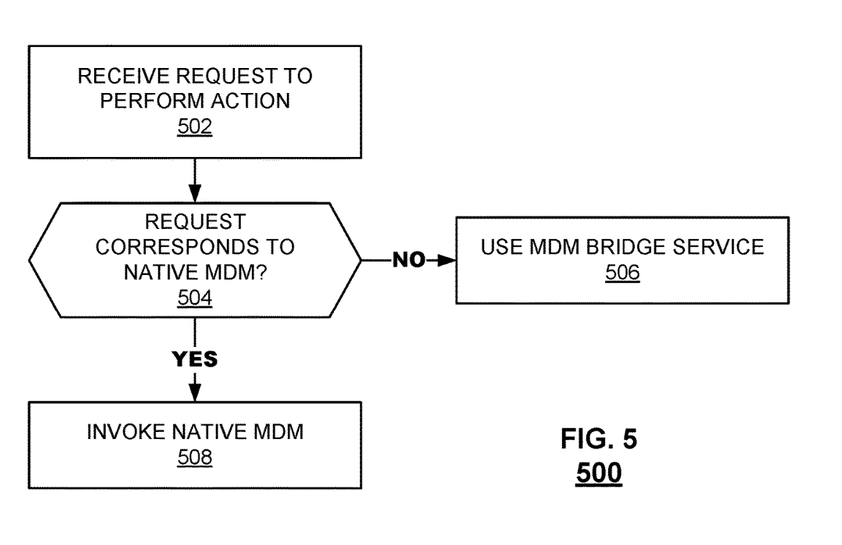
FIG. 5 is a flow chart illustrating an embodiment of a process in which a bridge service and a native device manager provide device management.

FIG. 5 is a flow chart illustrating an embodiment of a process 500 in which a bridge service and a native device manager provide device management. In various embodiments, the process of FIG. 5 may be performed by and/or with respect to a device management server, such as device management server 310 of FIG. 1. FIG. 5 is an example of 406 of FIG. 4.

In the example shown, a request to perform an action at an UI is received (502). In some embodiments, the request may be an action that is capable of being performed by a native MDM. In other embodiments, the request may be an action that is not capable of being performed by a native MDM. In various embodiments, a request may include several actions, some of which are capable of being performed by the native MDM and some of which are not capable of being performed by the native MDM. The requested action may include modification of device components, including components provided in a privileged user space such as scripts, registry, and file system. Examples of privilege user space elements are shown in FIG. 3.

It is determined whether the request corresponds to the native MDM (504). For example, the process may determine whether the native MDM is configured to perform an action corresponding to the request. As further described herein, the native MDM may be configured to perform only predefined functions shipped with the device.

If a request corresponds to the native MDM, then the native MDM is invoked (508). Otherwise, if the request does not correspond with the native MDM, then an MDM bridge service is used (506). In various embodiments, the MDM bridge service may be configured to perform custom actions including manipulation of components of a privileged user space such as scripts, registry, and file system.

Figure 6A:
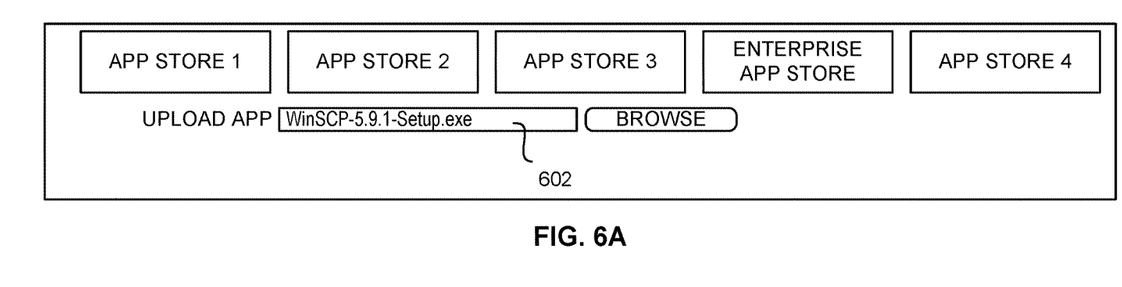
FIG. 6A is a block diagram illustrating an embodiment of a user interface of a MDM bridge service for installing applications.
Figure 6B:
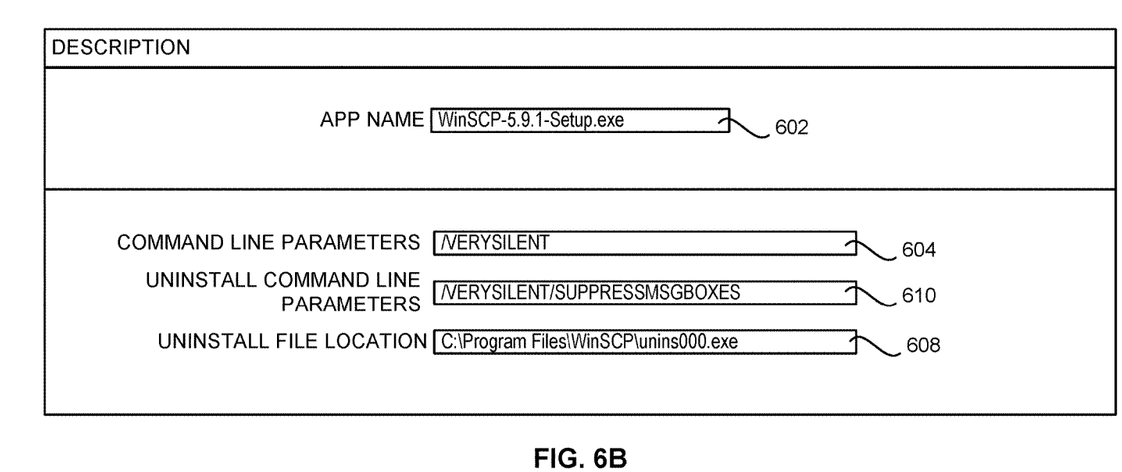
FIG. 6B is a block diagram illustrating an embodiment of a user interface of a MDM bridge service for installing applications.

Functions that can be performed by the MDM bridge service include controlling a file system, registry, script, configuration and/or policy specification, installing an application, uninstalling an application, executing an application, and other functions that a native MDM service is typically unable to fully perform. More specifically, the MDM bridge service may be configured to provision a software license for a third party product, retrieve a log file (e.g., to allow for remote troubleshooting), install applications that are not distributed via MSI package, activate a third party product, change a machine name, change a device UI appearance such as desktop background or screensaver, change the default browser or modify browser settings such as adding bookmarks, add shortcuts to web clips to the desktop or start menu, install or update a hardware driver, and/or other functions.

In addition, administrative functions that can be performed by the MDM bridge service includes deploying software to an operating system (e.g., O365 suite to Windows 10® or legacy software that is not provided via an installer), deploying any portable executable software to an operating system without having to install the software, creating shortcuts for an executable or webpage such as deploying web clips, and creating a local user remotely and assigning rights to the user.

In addition, functions that can be performed by the MDM bridge service includes checking whether a registry entry is present, reading a registry value, creating or updating a registry key or registry value, checking whether a file path is present, reading content of a file, creating or updating a file or content of the file, and installing an executable file onto the endpoint device. An example of installing an application is shown in FIGS. 6A-6D.

In one aspect, process 500 enables a unified administrator user interface to be presented. That is, a single administrator user interface (e.g., admin user interface 130 of FIG. 1) may control both a native MDM and an MDM bridge service, where selection between the native MDM and MDM bridge service to perform a particular function is opaque to the administrator. A unified administrator user interface operates by selectively invoking the MDM bridge service or the native MDM based on a requested action, while appearing to be a single seamless user interface to the administrator. For example, whether an action is executed by a native MDM or an MDM bridge service is transparent to the administrator. That is, a first task may be performed by the native MDM protocol and communicated to the device via a first communication channel and a second task may be performed by the MDM bridge service and communicated to the device via a second communication channel.

FIG. 6A is a block diagram illustrating an embodiment of a user interface of a MDM bridge service for installing applications. FIG. 6B is a block diagram illustrating an embodiment of a user interface of a MDM bridge service for installing applications.

The user interfaces shown in FIGS. 6A and 6B may be rendered by a device on a display. The user interfaces may be provided as part of an administrator user interface such as admin user interface 130 of FIG. 1. For example, the user interfaces may be used by an administrator of a device management server 100 to configure applications for distribution to managed device 120. That is, the administrator may indicate, via the user interfaces shown in FIGS. 6A and 6B, how an application is distributed and/or installed on managed devices. The application may be distributed to a management device according to parameters selected by an administrator and installed by an MDM bridge service such as MDM bridge service 254 of FIG. 2 or MDM bridge service 360 of FIG. 3 on a respective managed device.

In FIG. 6A, an application is selected for distribution. A user may upload an application via the user interface shown in FIG. 6A. A file containing executable code to install the application may be stored on the device and indicating (e.g., link or upload) the file 602 via the interface of FIG. 6A initiates an installation process. In this example, the file is an application developed in-house in the form of an executable file named "WinSCP-5.9.1-Setup.exe". Other types of installers are also possible. As shown, apps that can be installed may be categorized by the platform they are compatible with or app store they are offered in, e.g., App Store 1, App Store 2, App Store 3, Enterprise App Store (e.g., in-house apps), and App Store 4. Examples of app stores include iTunes®, Google Play®, Windows®, and other Web applications. In response to uploading of the application file, the user interface shown in FIG. 6B may be rendered.

In FIG. 6B, a user may enter additional configuration options/parameters for the application. For example, the user may indicate a URL from which to download the application, command line parameters, a target directory, uninstall command line parameters, application uninstall file locations, and the like. Here, the command line parameter 604 is "/VERY SILENT," which means that the application may be installed silently on a device without prompting a user of the device at the beginning of setup of the application. Additional information about command line parameters may be displayed on the user interface. Example descriptions of command line parameters include a description of /SILENT and /VERYSILENT.

In contrast to typical techniques that are able to install only software in the form of MSI packages, the techniques disclosed herein are able to accommodate the deployment of software regardless of packaging. For example, an administrator need not provide downloadable software as an MSI package and instead is able to provide downloadable software in any format.

In various embodiments, at the time an application is installed, an administrator may be prompted to associate an uninstall script with the application. The uninstall script may be used in the future when the application is uninstalled to remove all data associated with an application from a device. An uninstallation script may remove and/or modify of specific resources in response to a trigger such as request to uninstall an application. Information about uninstallation such as file location where an uninstall script is located and uninstall command line parameters may be provided to or displayed on the user interface.

Figure 7:
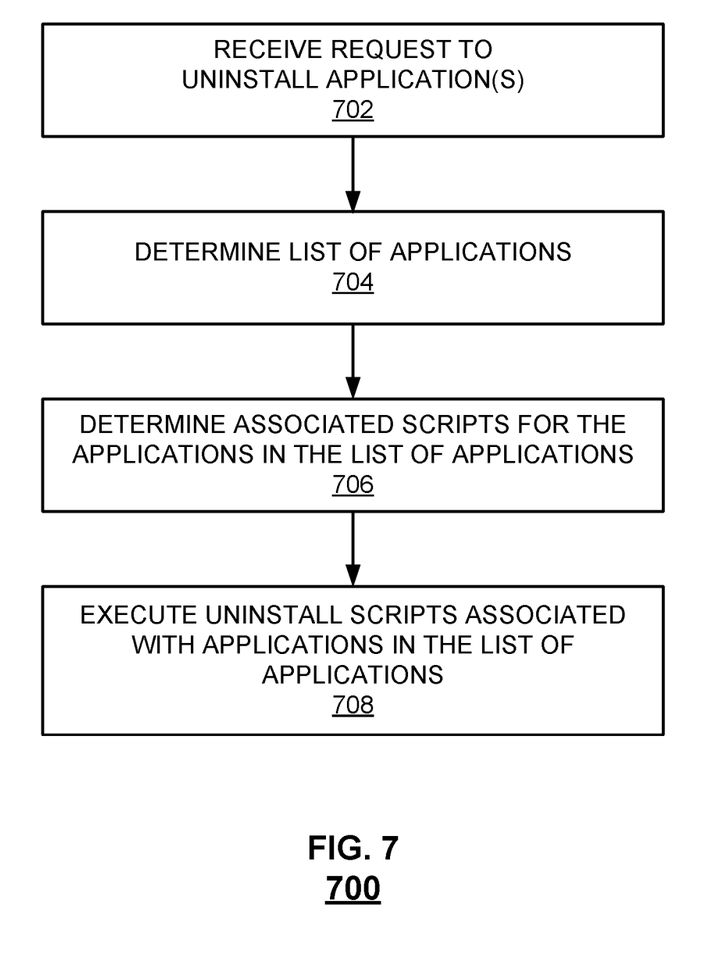
FIG. 7 is a flow chart illustrating an embodiment of a process to uninstall an application from a device.

FIG. 7 is a flow chart illustrating an embodiment of a process 700 to uninstall an application from a device. In various embodiments, process 700 allows an administrator to perform a clean uninstall of all applications instead of needing to remove each application one by one. In various embodiments, process 700 may be performed by a device using a native MDM and/or an MDM bridge service such as device 320. Depending on the application, a native MDM or an MDM bridge service may be invoked to facilitate installation or uninstallation of the application. The determination of whether a native MDM is used or an MDM bridge service is used may be by a process such as process 500 of FIG. 5. In various embodiments, process 700 may be performed by a device management server such as device management server 310 with respect to a device such as device 320 of FIG. 3.

A request to uninstall one or more applications is received (702). The request may be made by an administrator who selects an application to be uninstalled from all devices being used by company employees. The request may be made when a device is retired. In various embodiments, when a device is retired, some or all of the applications are uninstalled as follows.

A list of applications is determined (704). In various embodiments, a list of uninstall scripts is maintained and associated with applications. In some instances, when a device is retired, a list of all application on the device is determined. When a device is retired, each of the uninstall scripts on the list is performed to uninstall all of the applications associated with the scripts on the list. In various embodiments, the list of uninstall scripts is maintained by the MDM bridge service. For example, uninstall parameters such as script location and argument may be stored by a server. The server may pass the uninstall parameters to the MDM bridge service for uninstallation.

Associated scripts for application in the list of applications are determined (706). For example, an uninstall script that was associated with an application at install time may be looked up. In various embodiments, an application might not have an associated script. If an application does not have an associated uninstall script, the application may be uninstalled according to default procedures.

Uninstall scripts associated with applications in the list of applications are executed (708). In various embodiments, when an application is uninstalled, an associated uninstall script is executed to remove the application and all associated data from a device.

Various functions including encryption, installation of drivers, typical IT tasks to set up a new employee device, etc. can be invoked or initiated by the MDM bridge service. The MDM bridge service provides a way for a script intended to be executed on a device to be deployed with adequate privileges to carry out desired functions. A script can be disseminated to devices via a user interface such as the administrative user interface 130 of FIG. 1. An administrator user may designate the script to be propagated to a particular device or group of devices via the user interface. In response to this command, the MDM bridge service may deploy the scripts to the designated device(s), where they are executed by the devices.

In various embodiments, a new bridge setting may be configured by indicating a corresponding MDM bridge script (e.g., install shortcuts PowerShell script) and a corresponding uninstall script (e.g., uninstall shortcuts PowerShell script). Examples of bridge scripts include scripts to diagnose system problems, generate an MDM report, generate an inventory of hardware, generate an inventory of software, provide system information and state, execute a shortcut by running an associated ps script, import registry data, provide browsing history, install various drivers (e.g., printer drivers), and the like.

In contrast to typical techniques that are able to perform variable substitution only for a native MDM side of an operating system, the techniques disclosed here are able to perform variable substitution for non-native MDM portions of the operating system as well. In some embodiments, attributes are imported from collected MDM information (e.g., a profile) or from lightweight directory access protocol (LDAP) for a user and populated in code, scripts, or applications. In various embodiments, the LDAP is a protocol for accessing and maintaining distributed directory information services over an IP network. Variable substitution can be used to create scripts, registry files, and convert command line to executables. For example, apps may be pre-populated with a user's name by substituting each appearance of $user with a user's name, where the user's name is obtained from a setting of the device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A physical device comprising:
 a communications interface configured to receive, from a device management server, an indication to perform an action that requires access to a privileged user space of the physical device; and
 a processor configured to:
  use a native device management service, wherein the native device management service is configured to perform only predefined functions without access to the privileged user space; and
  use a mobile device management (MDM) bridge service to perform the action, wherein the MDM bridge service runs in a security context that enables the service to operate in the privileged user space.

2. The device of claim 1, wherein the MDM bridge service runs in a background on the device.

3. The device of claim 1, wherein the MDM bridge service is configured to respond to commands from the device management server.

4. The device of claim 1, wherein:
 the MDM bridge service is configured to periodically check with the device management server for outstanding actions to perform; and
 a status of an execution of outstanding actions is reported asynchronously to the device management server.

5. The device of claim 4, wherein the MDM bridge service is configured to:
 detect a session between a native device management service and the device management server; and
 initiate a session of the MDM bridge service in response to the detected session between the native device management service and the device management server.

6. The device of claim 1, wherein the processor is further configured to:
 send a request to register the device;
 receive, in response to the request, an installer for the MDM bridge service; and
 automatically install the MDM bridge service.

7. The device of claim 6, wherein the installer is one of an MSI installer and a Win 32 installer.

8. The device of claim 1, wherein the processor is further configured to perform functions selected by a user of the device.

9. The device of claim 1, wherein the MDM bridge service is configured to control a file system of the device.

10. The device of claim 1, wherein the MDM bridge service is configured to control a registry of the device.

11. The device of claim 1, wherein the MDM bridge service is configured to execute a script on the device.

12. The device of claim 1, wherein the MDM bridge service is configured to control at least one of a configuration specification and a policy specification.

13. The device of claim 1, wherein the MDM bridge service is configured to install an application including associating the application with an uninstall script configured to automatically remove the application and all associated data when the application is uninstalled.

14. The device of claim 1, wherein the MDM bridge service is configured to provide a predefined number of encryption keys.

15. The device of claim 1, wherein communications between the MDM bridge service and the device management server are authenticated.

16. The device of claim 1, wherein the MDM bridge service is headless.

17. The device of claim 1, wherein the privileged user space includes at least one of: a registry, a file system, and scripts.

18. A method comprising:
receiving, from a device management server, an indication to perform an action that requires access to a privileged user space of a physical device;
using a native device management service, wherein the native device management service is configured to perform only predefined functions without access to the privileged user space; and
using a mobile device management (MDM) bridge service to perform the action, wherein the MDM bridge service runs in a security context that enables the service to operate in the privileged user space.

19. A computer program product embodied in a non-transitory computer readable storage medium and comprising computer instructions for:
receiving, from a device management server, an indication to perform an action that requires access to a privileged user space of a physical device;
using a native device management service, wherein the native device management service is configured to perform only predefined functions without access to the privileged user space; and
using a mobile device management (MDM) bridge service to perform the action, wherein the MDM bridge service runs in a security context that enables the service to operate in the privileged user space.

20. A server comprising:
a communications interface;
a processor coupled to the communications interface, the processor configured to:
receive, via an administrative user interface, an indication to perform with respect to a managed physical device, a management action not within a native device management functionality of the managed physical device; and
invoke a mobile device management (MDM) bridge service running on the managed device to perform the action by sending a request via the communications interface, wherein the MDM bridge service runs in a security context that enables the service to operate in a privileged user space.

21. The server of claim 20, wherein:
the administrative user interface exposes a set of management actions, wherein some of the management actions are native and some of the management actions are not native.

22. The server of claim 20, wherein the bridge service is invoked based on a determination that the MDM bridge service is to be used and the native device management functionality is used based on a determination that the MDM bridge service is not to be used.

* * * * *